US011308002B2

United States Patent
Gnanasambandam et al.

(10) Patent No.: US 11,308,002 B2
(45) Date of Patent: Apr. 19, 2022

(54) SYSTEMS AND METHODS FOR DETECTING EXPECTED USER INTERVENTION ACROSS MULTIPLE BLADES DURING A KEYBOARD, VIDEO, AND MOUSE (KVM) SESSION

(71) Applicant: Dell Products, L.P., Round Rock, TX (US)

(72) Inventors: Balamurugan Gnanasambandam, Pondicherry (IN); Rajeshkumar Ichchhubhai Patel, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 87 days.

(21) Appl. No.: 16/351,096

(22) Filed: Mar. 12, 2019

(65) Prior Publication Data
US 2020/0293459 A1   Sep. 17, 2020

(51) Int. Cl.
*G06V 30/10* (2022.01)
*G06F 13/10* (2006.01)
(Continued)

(52) U.S. Cl.
CPC .......... *G06F 13/102* (2013.01); *G06F 9/4401* (2013.01); *G06K 9/6215* (2013.01);
(Continued)

(58) Field of Classification Search
CPC .............. G06F 3/04883; G06F 9/4843; G06K 2209/03; G06K 9/03; G06K 2209/01;
(Continued)

(56) References Cited

U.S. PATENT DOCUMENTS

| | | | |
|---|---|---|---|
| 8,819,779 B2 * | 8/2014 | Chandrasekhar | G06F 21/85 726/3 |
| 9,454,415 B2 * | 9/2016 | Sorenson | G06F 11/006 |

(Continued)

FOREIGN PATENT DOCUMENTS

CN    106933172 A    *  7/2017

OTHER PUBLICATIONS

Mezger et al., Functional GUI Testing of In-Vehicle Infotainment Systems in Virtual and Real Environments, Apr. 2017 [retrieved Aug. 2, 2020], pp. 1-4. Retrieved:https://www.semanticscholar.org/paper/Functional-GUI-Testing-of-In-Vehicle-Infotainment/dcf2eac032762520f00ae1f9455c89bb347f1f1a <br> (Year: 2017).*

(Continued)

*Primary Examiner* — Matthew C Bella
*Assistant Examiner* — Dennis Rosario
(74) *Attorney, Agent, or Firm* — Fogarty LLP

(57) ABSTRACT

Embodiments of systems and methods for detecting expected user intervention across multiple blades during a Keyboard, Video, and Mouse (KVM) session are discussed. In an embodiment, a chassis may include an Enclosure Controller (EC) coupled to a plurality of Information Handling Systems (IHSs) in a chassis, the EC comprising: a processor; and a memory coupled to the processor, the memory having program instructions stored thereon that, upon execution, cause the EC to: select a first IHS to initiate a first KVM session; register for a notification from the first IHS while the first IHS performs one or more operations; switch to a second IHS to initiate a second KVM session; and during the second KVM session, receive the notification.

17 Claims, 5 Drawing Sheets

(51) Int. Cl.
*G06F 9/4401* (2018.01)
*G06K 9/62* (2022.01)
*G06V 20/40* (2022.01)
*G06F 3/04842* (2022.01)

(52) U.S. Cl.
CPC .......... *G06V 20/46* (2022.01); *G06F 3/04842* (2013.01); *G06V 30/10* (2022.01)

(58) Field of Classification Search
CPC ..... G06K 9/00711; G06K 2009/00738; G06K 9/325; G06Q 10/0637; G06Q 10/20; G06V 30/10
See application file for complete search history.

(56) References Cited

U.S. PATENT DOCUMENTS

| | | | | |
|---|---|---|---|---|
| 9,836,309 | B2 * | 12/2017 | Lambert | G06F 13/4022 |
| 10,020,996 | B1 * | 7/2018 | Protasov | G06F 8/34 |
| 2010/0223492 | A1 * | 9/2010 | Farrugia | H04L 65/1006 |
| | | | | 714/4.1 |
| 2011/0022771 | A1 | 1/2011 | Foerster | |
| 2012/0296856 | A1 * | 11/2012 | Barkan | G06N 5/04 |
| | | | | 706/12 |
| 2013/0273853 | A1 * | 10/2013 | Reed | H04W 24/08 |
| | | | | 455/67.11 |
| 2014/0006676 | A1 * | 1/2014 | Chandrasekhar | G06F 13/4022 |
| | | | | 710/316 |
| 2017/0148487 | A1 * | 5/2017 | Krishnakumar | H04N 7/147 |
| 2018/0129586 | A1 * | 5/2018 | Gillaspie | G06K 9/00463 |
| 2019/0087927 | A1 * | 3/2019 | Dewitt | G06F 21/84 |

OTHER PUBLICATIONS

Machine translation of CN-106933172-A to REN, retrieved Oct. 6, 2021, 11 pages. Retrieved: https://patents.google.com/patent/CN106933172A/en?oq=CN+106933172+A (Year: 2021).*

Panse, CHARM-Card: Hardware Based Cluster Control And Management System, Dissertation, Nov. 10, 2009 [retrieved Jan. 11, 2022], Universitat Heidelberg, pertient pp. 1,3,5,7-9,11-25,27-77,79-101,103-111,113-141,143-149 & 151-159, 159 total pages. Retrieved: http://www.ub.uni-heidelberg.de/archiv/10013 (Year: 2009).*

* cited by examiner

FIG. 1C

```
(1/3): pgre-e17/primary_db
(2/3): epel/x86_64/updateinfo
(3/3): epel/x86_64/primary
Determining fastest mirrors
epel
No package tesseract-ocr available.
Error: Nothing to do
[balamurugan_gnanasam@localhost ~]$ sudo yum in
Loaded Plugins: fastestmirror, langpacks
Repository epel-testing is listed more than onc
Repository epel-testing-debuginfo is listed mor
Repository epel-testing-source is listed more t
Repository epel is listed more than once in the
Repository epel-debuginfo is listed more than o
Repository epel-source is listed more than once
Loading mirror speeds from cached hostfile
Resolving Dependencies
--> Running transaction check
---> Package tesseract.x86_64 0:3.04.00-3.el7 w
--> Processing Dependency: liblept.so.4()(64bit)
--> Running transaction check
---> Package leptonica.x86_64 0:1.72-2.el7 will
--> Finished Dependency Resolution
```

```
Resolving Dependencies
--> Running transaction check
---> Package tesseract.x86_64 0:3.04.00-3.el7 will be installed
--> Processing Dependency: liblept.so.4()(64bit) for package:
tesseract-3.04.00-3.el7.x86_64
--> Running transaction check
---> Package leptonica.x86_64 0:1.72-2.el7 will be installed
--> Finished Dependency Resolution Dependencies Resolved =========================================================
 Package                        Arch
=========================================================
Installing:
    tesseract                   x86_64
Installing for dependencies:
    leptonica                   x86_64

Transaction Summary
Install 1 Package (+1 Dependent Package)

Total download size: 12 M
Installed size: 43 M
Is this ok [y/d/N]:
```

```
[balamurugan_gnanasam@localhost templ]$ tesseract
Capture1.JPG out1
Tesseract Open Source OCR Engine v3.04.00 with Leptonica
[balamurugan_gnanasam@localhost templ]$ tesseract
Capture2.JPG out2
Tesseract Open Source OCR Engine v3.04.00 with Leptonica
[balamurugan_gnanasam@localhost templ]$ diff out1.txt
out2.txt | tail
49c44
< ---
> Install 1 Package (+1 Dependent Package)
51c46,48
<
> ---
> Total download size: 12 M
> Installed size: 43 M
> Is this ok [y/d/N]:
[balamurugan_gnanasam@localhost templ]$
```

100C

130

131

132

133

SYSTEMS AND METHODS FOR DETECTING EXPECTED USER INTERVENTION ACROSS MULTIPLE BLADES DURING A KEYBOARD, VIDEO, AND MOUSE (KVM) SESSION

FIELD

The present disclosure generally relates to Information Handling Systems (IHSs), and, more particularly, to systems and methods for detecting expected user intervention across multiple blades during a Keyboard, Video, and Mouse (KVM) session.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs are often installed within a chassis or rack. In some cases, it is possible to use the same keyboard, video, and mouse (KVM) to interact with any given one of several IHSs in a chassis, one at a time, under control of an Enclosure Controller (EC) or Chassis Management Controller (CMC).

SUMMARY

Embodiments of systems and methods for detecting expected user intervention across multiple blades during a Keyboard, Video, and Mouse (KVM) session are described. In an illustrative, non-limiting embodiment, a chassis may include an Enclosure Controller (EC) coupled to a plurality of Information Handling Systems (IHSs) in a chassis, the EC comprising: a processor; and a memory coupled to the processor, the memory having program instructions stored thereon that, upon execution, cause the EC to: select a first IHS to initiate a first KVM session; register for a notification from the first IHS while the first IHS performs one or more operations; switch to a second IHS to initiate a second KVM session; and during the second KVM session, receive the notification.

The first KVM session may include a remote desktop or a Virtual Network Computing (VNC) session. The operation may include a Basic System Input/Output (BIOS) boot-up operation or an IHS maintenance operation. To register for the notification, the program instructions, upon execution, may cause the EC to receive a notification selection from a user via a Graphical User Interface (GUI). Additionally, or alternatively, to register for the notification, the program instructions, upon execution, may cause the EC to receive a keyword.

To receive the notification, the first IHS may be configured to: produce first Optical Character Recognition (OCR) results from a first video frame of a command-line interface of the first IHS; and recognize the keyword in the first OCR results.

Additionally or alternatively, to receive the notification, the first IHS may be configured to: produce first OCR results from a first video frame of a command-line interface of the first IHS; produce second OCR results from a second video frame of a command-line interface of the second IHS; identify differences between the second and first OCR results; and recognize the keyword in the differences. The program instructions, upon execution, may cause the EC to switch to the first IHS.

In another illustrative, non-limiting embodiment, a hardware memory of an EC configured to manage a plurality of IHSs coupled to a chassis, may have program instructions stored thereon that, upon execution, cause the EC to: select a first IHS to initiate a first KVM session; register for a notification from the first IHS while the first IHS performs one or more operations; switch to a second IHS to initiate a second KVM session; during the second KVM session, receive the notification; and switch to the first IHS.

For example, the first KVM session may include a remote desktop or a VNC session. The one or more operations may include a BIOS operation. To register for the notification, the program instructions, upon execution, may cause the EC to receive a notification selection via a GUI. Additionally, or alternatively, to register for the notification, the program instructions, upon execution, may cause the EC to receive a keyword.

To receive the notification, the first IHS may be configured to: produce first OCR results from a first video frame of the first IHS; and recognize the keyword in the first OCR results. To receive the notification, the first IHS may be configured to: produce first OCR results from a first video frame of the first IHS; produce second OCR results from a second video frame of the second IHS; identify differences between the second and first OCR results; and recognize the keyword in the differences.

In yet another illustrative, non-limiting embodiment, a method may include selecting a first IHS to initiate a first KVM session; registering for a notification from the first IHS while the first IHS performs one or more operations; switching to a second IHS to initiate a second KVM session; during the second KVM session, receiving the notification; and switching to the first IHS.

Registering for the notification may include receiving a notification selection via a GUI. Registering for the notification further comprises receiving a keyword. Receiving the notification further comprises: producing first OCR results from a first video frame of a command-line interface of the first IHS; and recognizing the keyword in the first OCR results. Additionally, or alternatively, receiving the notification may include: producing first OCR results from a first video frame of a command-line interface of the first IHS; producing second OCR results from a second video frame of a command-line interface of the second IHS; identifying differences between the second and first OCR results; and recognizing the keyword in the differences.

BRIEF DESCRIPTION OF THE DRAWINGS

The present invention(s) is/are illustrated by way of example and is/are not limited by the accompanying figures.

Elements in the figures are illustrated for simplicity and clarity, and have not necessarily been drawn to scale.

FIG. 1C is a diagram illustrating a differential Optical Character Recognition (OCR) operation, according to some embodiments.

DETAILED DESCRIPTION

Figure 1A:
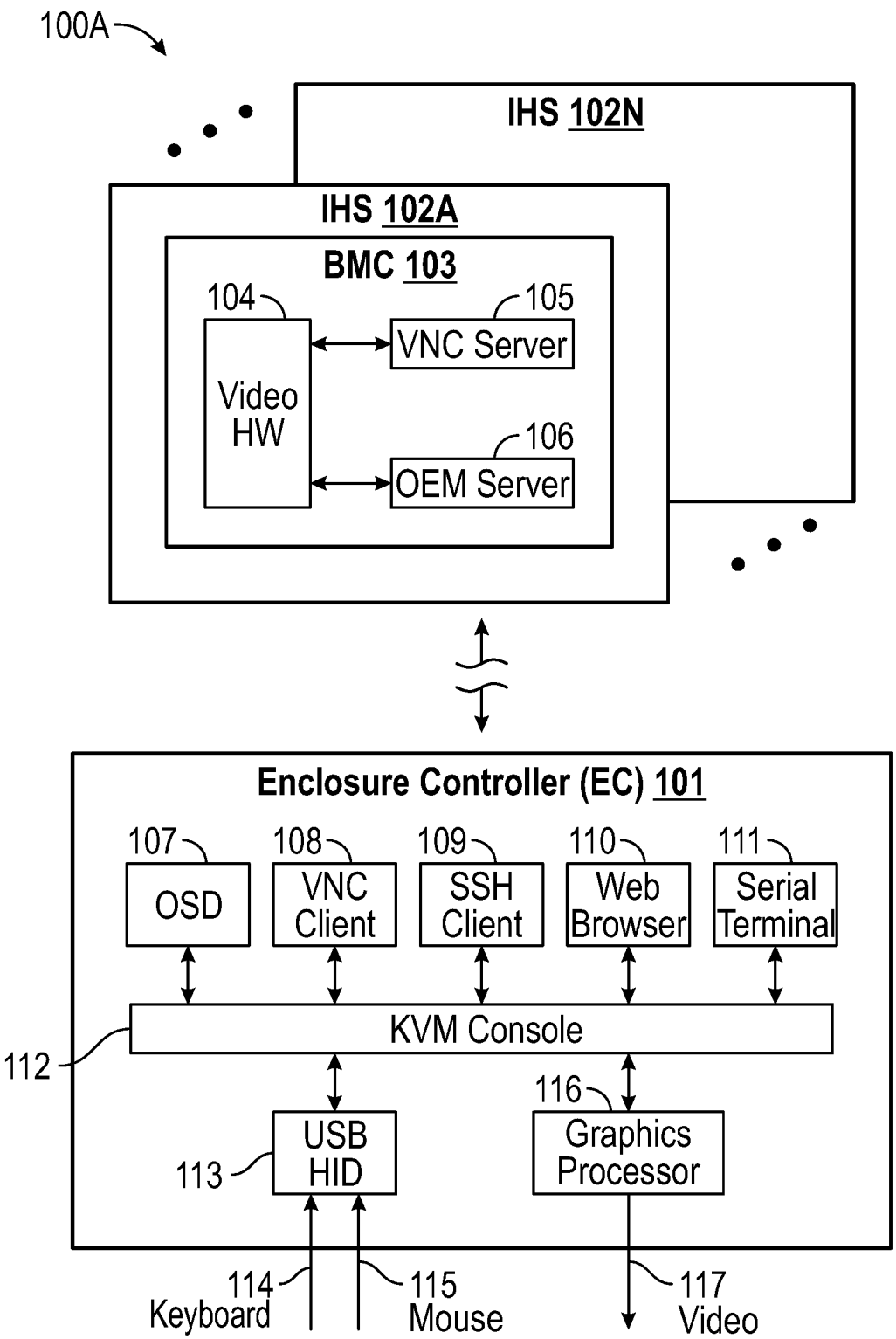
FIG. 1A is a diagram illustrating a system for detecting expected user intervention across multiple blades during a Keyboard, Video, and Mouse (KVM) session, according to some embodiments.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

In various embodiments, systems and methods described herein enable Keyboard-Video-Mouse (KVM) sessions across multiple IHSs using an Enclosure Controller (EC) or Chassis Management Controller (CMC) of a chassis or rack. Particularly, an EC or CMC may be configured to: (i) receive keyboard and mouse inputs from a user operating the chassis during a KVM session (e.g., desktop sharing or the like) and transmit those inputs to a target IHS in the chassis; and (ii) receive graphics produced by the target IHS to the client IHS during the KVM session.

With respect to KVM technologies, virtual KVM (vKVM) is a software application that enables video, keyboard, and mouse redirection in Baseboard Management Controllers (BMCs) and other service processors. To use vKVM, a client IHS installs browser plugins (e.g., "Active X" or "Java") or uses Hypertext Markup Language (HTML) web sockets, to access the video output of a target IHS over a network. Protocols that support vKVM include, but are not limited to, Dambrackas Video Compression (DVC), American Megatrend's (AMI's) Advanced Adaptive Video Compression Algorithm (AAVICA), etc.

Another example of KVM technology in use today is Virtual Network Computing (VNC), which uses the Remote Frame Buffer protocol (RFB). A VNC client transmits keyboard and mouse events from the client IHS to the target IHS, relaying graphical screen updates back in the other direction, over a network. Yet other KVM technologies include the Remote Desktop Protocol (RDP) and other proprietary and Original Equipment Manufacturer (OEM) protocols (e.g., such as Integrated Lights-Out or "iLO", etc.).

Various embodiments described herein may be implemented in an EC or CMC. In some implementations, an EC may include a processor core, a graphics core, and a memory. The graphics core may be coupled to the processor core via an Advanced Microcontroller Bus Architecture (AMBA) high-performance bus (AHB)-to-Peripheral Component Interconnect (PCI) (AHB-to-PCI) bridge. For example, the processor core may be an ARM core and the graphics core may be a Matrox Graphics Inc. (MGA) core.

In some implementations, a user or administrator may perform maintenance activities (e.g., such as boot configuration, software installation or upgrades, etc.) on multiple IHSs of a chassis using multiple KVM sessions—e.g., one KVM session per target IHS. During these activities, the IHS in focus may require user intervention or interaction, usually in the form of a prompt, such as: "Press a key to continue," "Accept license terms," "Change partition," etc. Depending upon the activity being performed (and on the target IHS) these messages or prompts may appear at different times.

Conventionally, if the user were working on multiple IHSs concurrently, he or she would have to manually switch between IHSs to check whether that particular IHS needs an input. That is, the user would have to manually switch the focus of the EC's Graphical User Interface (GUI) (e.g., an administration or KVM console) between different KVM sessions to show the video to the user, so that the user can visually discover whether any particular IHS process is being held up. Sometimes, when the administrator is busy on one blade, the system on the other blades will wait until the user intervenes. Hence the time taken to complete the overall maintenance activities is extended.

To address these, and other problems, systems and methods described herein may virtually watch each blade console by each IHS (e.g., via a BMC) on each slot, interpret text shown on the console at regular intervals using Optical Character Recognition (OCR) and, if the text matches one or more keywords stored in a notification dictionary, send a notification to EC so that the EC can automatically provide a notification on the KVM console to the user.

As such, these systems and methods may detect a user intervention requirement through OCR, operable in pre-boot environments, without relying on the IHSs' Operating System (OS). In some cases, data captured from a screenshot (e.g., a video frame of a framebuffer) need not be shared outside of the IHS's own BMC, and only a generic notification (of whatever keyword was present in the dictionary) may be sent from each BMC to the EC. The notification dictionary may be updated based on user requirements via the KVM console, thus making the solution readily extendible, at run-time.

As used herein, the term "framebuffer" refers to a portion of memory containing a bitmap that drives a video display—that is, is a memory buffer containing at least one complete frame of data. The information in a framebuffer may include color values for every pixel to be shown on a display. Color values are commonly stored in any suitable number of bits. In some cases, an alpha channel may provide additional information about pixel transparency. The amount of memory required for a framebuffer depends upon the resolution of the video frames as well as on color depth and/or palette. In many implementations, a software framebuffer, such as fbdev in Linux, may emulate the operation of a hardware framebuffer by abstracting the physical method for accessing the underlying device into a memory map.

FIG. 1A is a diagram illustrating a system for detecting expected user intervention across multiple blades during a KVM session. Particularly, in chassis 100A, Enclosure Controller (EC) 101 is in communication with a plurality of IHSs 102A-N (e.g., blades or sleds). In this implementation, a user or administrator interacts with EC 101 using KVM console 112 via a graphical user interface (GUI) or the like.

EC 101 also executes one or more of: on-screen display (OSD) module 109, VNC client 110, Secure Shell (SSH) client 111, web browser 112, and/or serial terminal 113. One or more of these components may be configured to receive a video signal from a corresponding IHS 102A-N. For example, VNC client 110 in EC 101 may establish a connection with VNC server 105 of BMC 103 to enable a KVM session with IHS 102A.

Each of the plurality of IHSs 102A-N includes its own Baseband Management Controller (BMC) 103. BMC 103 in turn includes video hardware 104 (e.g., an integrated video core) and executes VNC server 105 and/or OEM server 106, each configured to output a video signal during a video redirection session using a respective protocol (e.g., RFB, proprietary, etc.).

In operation, Universal Serial Bus (USB) Human Interface Device (HID) module 113 capture keyboard 114 and/or mouse 115 events, and relays those events to a selected one of IHSs 102A-N. The user visually interacts with the selected IHS 102 using a local display configured to render video signal 117. Specifically, EC 101 provides video redirection for video content produced by video hardware 104 in selected IHS 102 to video port 117 (e.g., VGA, DisplayPort, HDMI, etc.). To output video 117, KVM console 112 may send a command to graphics processor or core 116 to scrape a framebuffer memory directly or by operation of a host CPU's PCI bus.

Figure 1B:
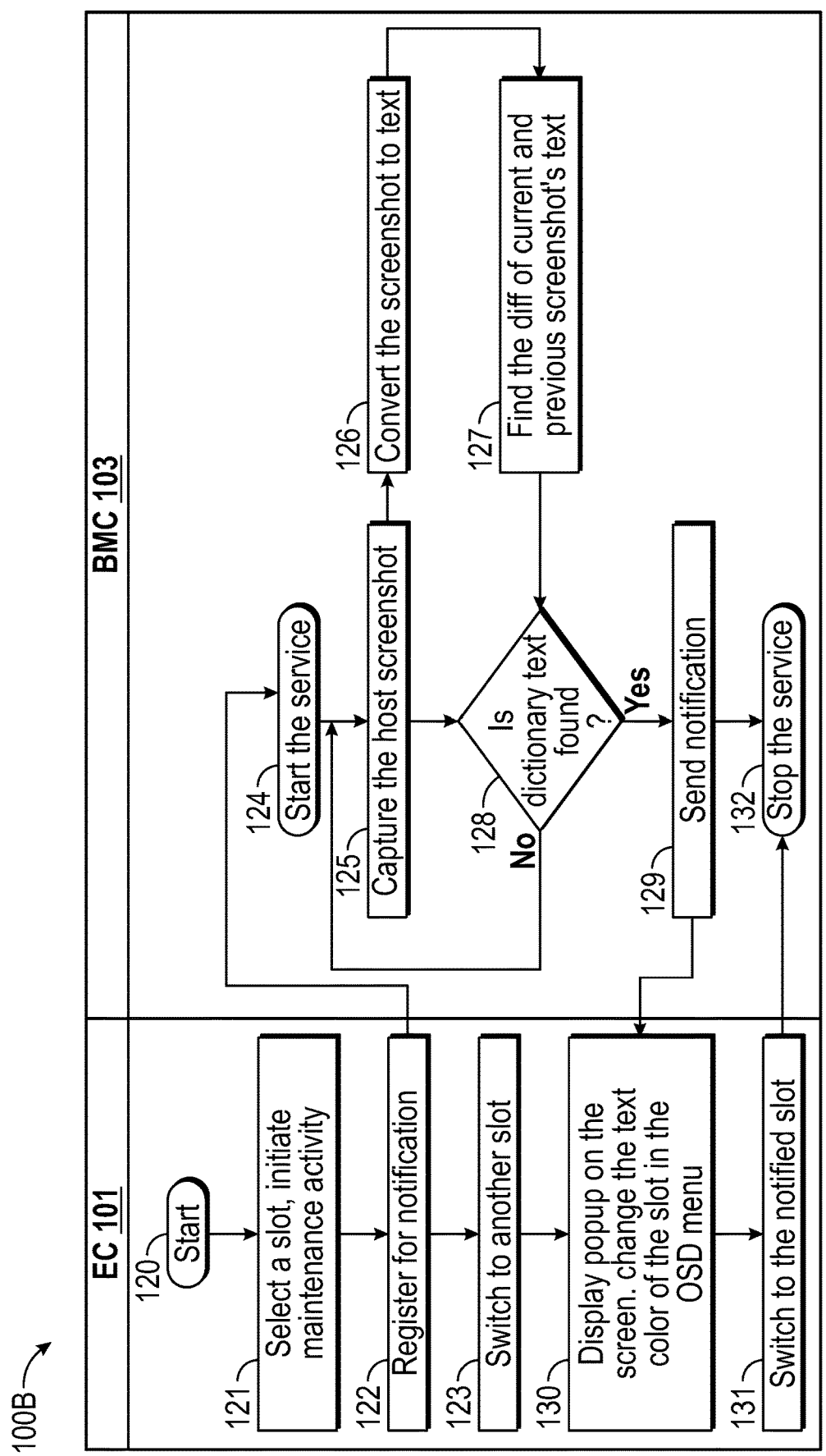
FIG. 1B is a diagram illustrating a method for detecting expected user intervention across multiple blades, according to some embodiments.

FIG. 1B is a diagram illustrating a method for detecting expected user intervention across multiple blades. In some embodiments, method 100B may be performed by EC 101 in cooperation with one or more BMCs 103 in a chassis (one for each IHS).

Particularly, method 100B begins at block 120. At block 121, a user selects a first one of a plurality of IHS slots to initiate a maintenance activity, for example, first IHS 102A. Examples of maintenance activities include, but are not limited to, pre-boot activities (e.g., BIOS configuration operations) and post-boot activities (e.g., installing, updating, or upgrading a software application, configuring an Operating System or OS), etc. At block 122, method 100B includes registering for a notification from first IHS 102A using KVM console 112.

At block 124, in response to block 123, BMC 103 starts a notification service for the first IHS 102A via VNC server 105 or OEM server 106. In some cases, the notification service may start upon a user's express request; in other cases, it may be automatically triggered by the user's switching between slots or blades.

At block 123, the user switches the focus of KVM console 112 to a second IHS 120B, for example, to perform a different maintenance activity. As the user works on the second IHS 120B, BMC 103 of the first IHS 102A continues on to block 125.

At block 125, BMC 103 captures one or more screenshots from the first IHS's display (e.g., from a framebuffer of video hardware 104) via VNC server 105 or OEM server 106. The screenshot may be an uncompressed, pixel-by-pixel frame of video, and/or it may be an image file in a compressed or uncompressed format (e.g., JPEG, etc.). At block 126, VNC server 105 or OEM server 106 performs one or more OCR operations upon the screenshots to transform each image into to a set of ASCII characters.

In some cases, block 128 may perform a comparison to determine whether one or more keywords, strings, or symbols from a notification dictionary, database, or look-up table (LUT) are present in a set of ASCII characters corresponding to a single video frame. In other cases, block 127 may calculate a first set of characters from a first video frame, a second set of characters from a second video frame, and it may determine the difference between the two sets—a differential set. Then, block 128 may perform a comparison to determine whether the one or more keywords are present in the differential set. If not control returns to block 125.

If the keyword is found, block 129 causes VNC server 105 or OEM server 106 of BMC 103 to send a notification to EC 101 in the form of a display popup on the KVM console's screen, for example. In some cases, the color of the text identifying the slot from where a notification was issued may change colors, or an icon may be highlighted.

In some implementations, upon receiving the notification at block 130, EC 101 may switch the respective slot at block 131, and BMC 103 may stop the notification service executed by VNC server 105 or OEM server 106 at block 132.

FIG. 1C is a diagram illustrating a differential OCR operation. In some embodiments, a first OCR operation may be performed upon first screenshot to produce a first set of text characters 130 and a second OCR operation may be performed upon second, subsequent screenshot to produce a second set of text characters 131. The difference between the second first sets of character is shown as differential set 132. For example, in this case, block 133 identifies text in the differential OCR set that matches keywords or phrases included in the notification dictionary ("Is this ok [y/d/N]:").

Figure 2:
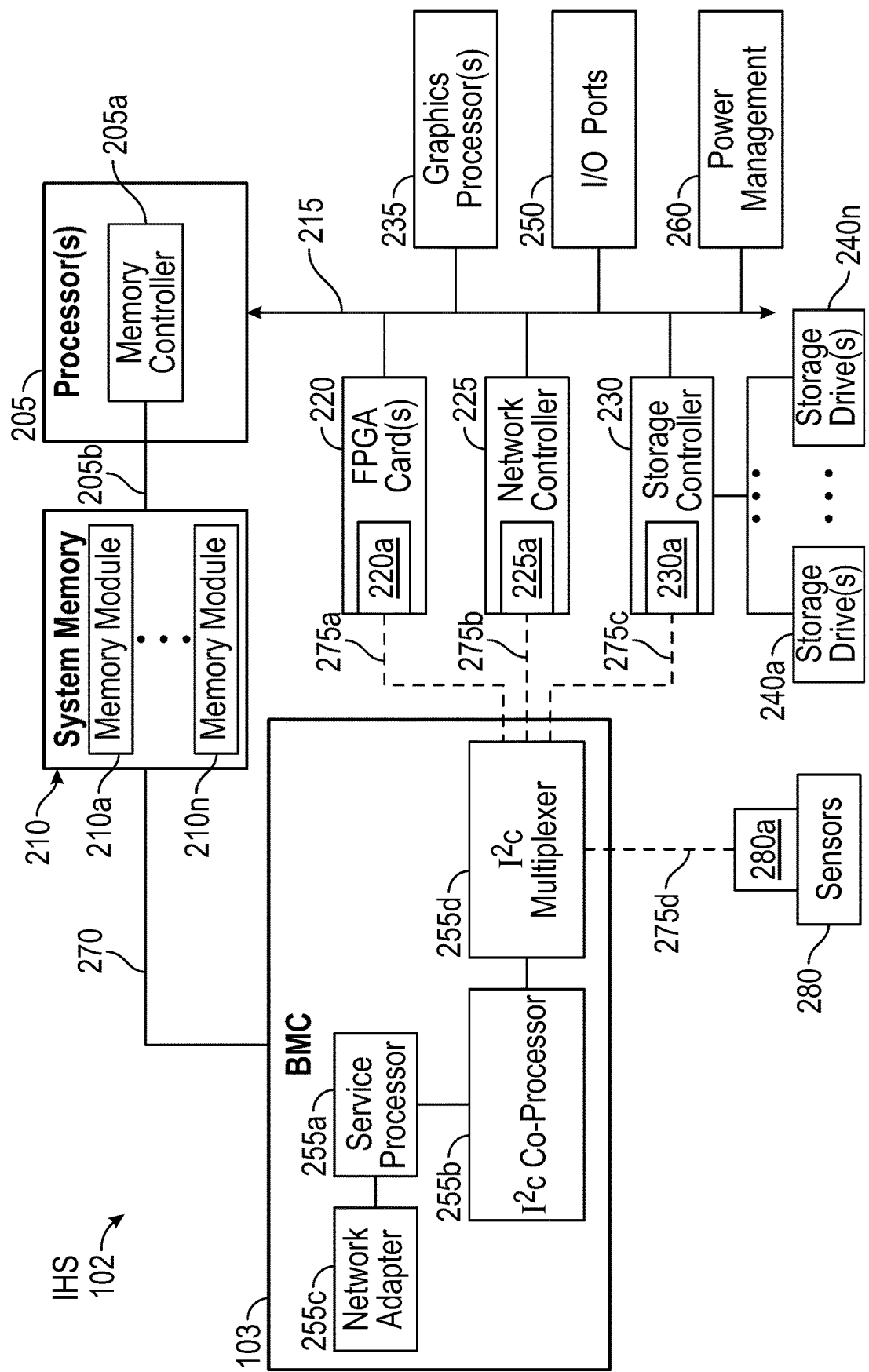
FIG. 2 is a diagram illustrating components of an Information Handling System (IHS), according to some embodiments.

FIG. 2 shows an example of an IHS 102 configured to implement systems and methods described herein. In some implementations, IHS 102 may be a computing component, such as a sled or blade, configured to share infrastructure resources provided by a chassis, for example, as shown in FIG. 9 (e.g., 905a-n and/or 915a-n). It should be appreciated, however, that although these embodiments show an IHS as sled or blade, other IHS implementations may be utilized including, but not limited to: desktops, laptops, appliances, and mobile devices, etc.

In some embodiments, processor(s) 205 may include a main processor and a co-processor, each of which may include a plurality of processing cores that, in certain scenarios, may each be used to run an instance of a server. In certain embodiments, one or all of processor(s) 205 may be graphics processing units (GPUs) in scenarios where IHS 102 has been configured to support functions such as multimedia services and graphics applications.

As illustrated, processor(s) 205 includes integrated memory controller 205a that may be implemented directly within the circuitry of processor 205, or memory controller 205a may be a separate integrated circuit that is located on the same die as processor 205. Memory controller 205a may be configured to manage the transfer of data to and from system memory 210 of IHS 102 via high-speed memory interface 205b.

System memory 210 is coupled to processor(s) 205 via memory bus 205b that provides processor(s) 205 with high-speed memory used in the execution of computer program instructions. Accordingly, system memory 210 may include memory components, such as such as static RAM (SRAM), dynamic RAM (DRAM), NAND Flash memory, suitable for supporting high-speed memory operations by the processor(s) 205. In certain embodiments, system memory 210 may combine both persistent, non-volatile memory and volatile memory.

In certain embodiments, system memory 210 may be include multiple removable memory modules. System memory 210 includes removable memory modules 210a-n. Each of removable memory modules 210a-n may correspond to a printed circuit board memory socket that receives corresponding module 210a-n, such as a DIMM (Dual In-line Memory Module), that can be coupled to the socket and then decoupled from the socket as needed, such as to upgrade memory capabilities or to replace faulty components. In other embodiments of IHS, system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 102 may utilize a chipset implemented by integrated circuits that are connected to each processor 205. All or portions of the chipset may be implemented directly within the integrated circuitry of an individual processor 205. The chipset may provide the processor(s) 205 with access to a variety of resources accessible via one or more buses 215. Various embodiments may utilize any number of buses to provide the illustrated pathways served by bus 215. In certain embodiments, bus 215 may include a PCIe (PCI Express) switch fabric that is accessed via a PCIe root complex. IHS 102 may also include one or more I/O ports 250, such as PCIe ports, that may be used to couple the IHS 102 directly to other IHSs, storage resources or other peripheral components.

As illustrated, a variety of resources may be coupled to processor(s) 205 of IHS 102 via bus 215. For instance, processor(s) 205 may be coupled to network controller 225, such as provided by a Network Interface Controller (NIC) that is coupled to IHS 102 and allows IHS 102 to communicate via an external network, such as the Internet or a LAN. Processor(s) 205 may also be coupled to power management unit 260 that may interface with (the power system unit of a chassis) in which IHS 102 may be installed as a sled or blade. In certain embodiments, graphics processor 235 may be included within one or more video or graphics cards, or an embedded controller, installed as components of IHS 102. In certain embodiments, graphics processor 235 may be an integrated part of BMC 103 and may be utilized to support the display of diagnostic and administrative interfaces related to IHS 102 via display devices that are coupled, either directly or remotely, to BMC 103.

As illustrated, IHS 102 may include one or more FPGA (Field-Programmable Gate Array) card(s) 220. Each of FPGA card(s) 220 supported by IHS 102 may include various processing and memory resources, in addition to an FPGA integrated circuit that may be reconfigured after deployment of IHS 102 through programming functions supported by the FPGA card 220. Each individual FGPA card 220 may be optimized to perform specific processing tasks, such as specific signal processing, security, data mining, and artificial intelligence functions, and/or to support specific hardware coupled to IHS 102.

In certain embodiments, IHS 102 may operate using a Basic Input/Output System (BIOS) that may be stored in a non-volatile memory accessible by processor(s) 205. The BIOS may provide an abstraction layer by which the operating system (OS) of the IHS 102 interfaces with its hardware components. Upon powering or restarting IHS 102, processor(s) 205 may utilize BIOS instructions to initialize and test hardware components, including both components permanently installed as components of the motherboard of IHS 102 and removable components installed within various expansion slots supported by the IHS 102. The BIOS instructions may also load an OS. In certain embodiments, IHS 102 may utilize Unified Extensible Firmware Interface (UEFI) in addition to or instead of a BIOS. In certain embodiments, the functions provided by a BIOS may be implemented, in full or in part, by BMC 103.

In certain embodiments, BMC 103 may operate from a different power plane from processor(s) 205 and other components of IHS 103, thus allowing BMC 103 to operate, and management tasks to proceed, while the processing cores of IHS 103 are powered off. As described, various functions provided by the BIOS, including launching the OS of IHS 103, may be implemented by BMC 103. In some embodiments, BMC 103 may perform various functions to verify the integrity of IHS 103 and its hardware components prior to initialization (e.g., in a bare-metal state).

BMC 103 may include service processor 255a, or specialized microcontroller, that operates management software that supports remote monitoring and administration of IHS 102. BMC 103 may be installed on the motherboard of IHS 102 or may be coupled to IHS 102 via an expansion slot provided by the motherboard. In support of remote monitoring functions, network adapter 255c may support connections with BMC 103 using wired and/or wireless network connections via a variety of network technologies.

As a non-limiting example of a BMC, the integrated Dell BMC (iDRAC) from Dell® is embedded within Dell PowerEdge™ servers and provides functionality that helps information technology (IT) administrators deploy, update, monitor, and maintain servers remotely.

In some embodiments, BMC 103 may support monitoring and administration of various managed devices 220, 225, 230, 280 of an IHS via a sideband bus interface. For instance, messages utilized in device management may be transmitted using I2C sideband bus connections 275a-d that may be individually established with each of the respective managed devices 220, 225, 230, 280 through the operation of I2C multiplexer 255d of BMC 103. As illustrated, certain of the managed devices of IHS 102, such as FPGA cards 220, network controller 225 and storage controller 230, are coupled to the IHS processor(s) 205 via in-line bus 215, such as a PCIe root complex, that is separate from the I2C sideband bus connections 275a-d used for device management. The management functions of BMC 103 may utilize information collected by various managed sensors 280 located within the IHS. For instance, temperature data collected by sensors 280 may be utilized by BMC 103 in support of closed-loop airflow cooling of the IHS 102.

In certain embodiments, the service processor 255a of BMC 103 may rely on an I2C co-processor 255b to implement sideband I2C communications between BMC 103 and managed components 220, 225, 230, 280 of the IHS. The I2C co-processor 255b may be a specialized co-processor or micro-controller that is configured to interface via a sideband I2C bus interface with the managed hardware components 220, 225, 230, 280 of IHS. In some embodiments, I2C co-processor 255b may be an integrated component of service processor 255a, such as a peripheral system-on-chip feature that may be provided by service processor 255a.

Each I2C bus 275a-d is illustrated as a single line in FIG. 2. However, in various implementations, each I2C bus 275a-d may include of a clock line and data line that couple BMC 103 to I2C endpoints 220a, 225a, 230a, 280a which may be identified as modular field replaceable units (FRUs).

In various scenarios, a portion of managed devices 220, 225, 230, 280 may support I2C bus 275a-d communications that utilize IPMI (Management Component Transport Protocol) messaging. For instance, certain types of legacy and less-sophisticated managed devices, such as temperature sensors 280, may utilize IPMI messaging and may thus be identified on the I2C bus 275d as an IPMI endpoints by the I2C coprocessor 255b. IHS 102 may include a variety of IPMI sensors 280 that collect various types of readings, such as intrusion detection and power consumption.

In providing sideband management capabilities, I2C coprocessor 255b may each interoperate with corresponding endpoint I2C controllers 220a, 225a, 230a, 280a that implement the I2C communications of respective managed devices 220, 225, 230. Endpoint I2C controllers 220a, 225a, 230a, 280a may be implemented as a dedicated microcontroller for communicating sideband I2C messages with BMC 103, or endpoint I2C controllers 220a, 225a, 230a, 280a may be integrated SoC functions of a processor of the respective managed device endpoints 220, 225, 230, 280.

In various embodiments, IHS 102 does not include each of the components shown in FIG. 2. In various embodiments, IHS 102 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into one or more processor(s) 205 as a systems-on-a-chip (SoC).

IHS 102 of FIG. 2 may be a compute sled, such as compute sleds 305a-n of FIG. 3 below, that may be installed within a chassis, that may in turn be installed within a rack. Installed in this manner, IHS 102 may utilized shared power, network and cooling resources provided by the chassis and/or rack.

Figure 3:
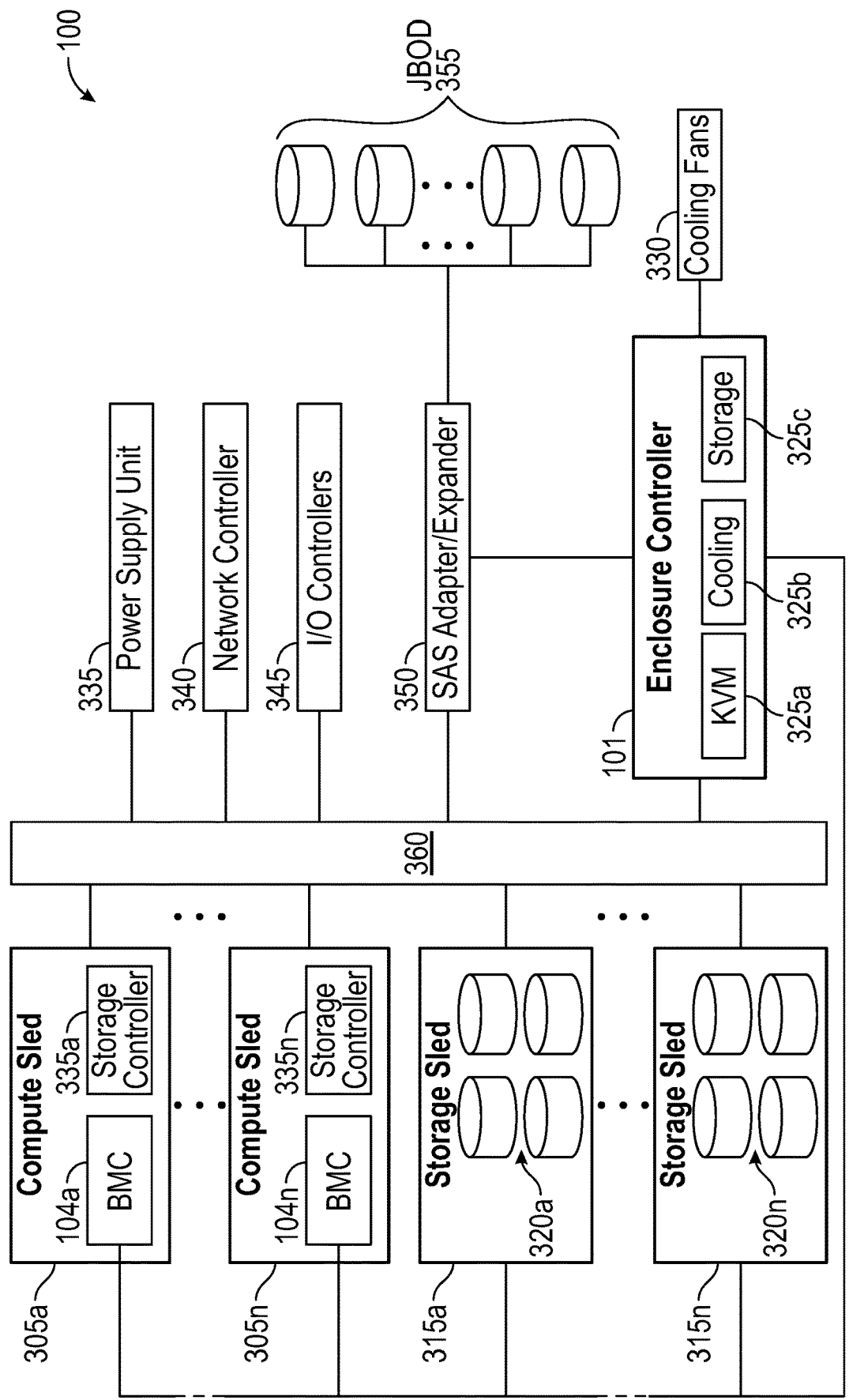
FIG. 3 is a diagram illustrating components of a chassis or rack, according to some embodiments.

FIG. 3 is a diagram illustrating components of a chassis or rack 100 comprising one or more compute sleds 305a-n and one or more storage sleds 315a-n that may be configured to implement the systems and methods described herein. Chassis 100 may include one or more bays that each receive an individual sled (that may be additionally or alternatively referred to as a tray, blade, and/or node), such as compute sleds 305a-n and storage sleds 315a-n. Chassis 100 may support a variety of different numbers (e.g., 4, 8, 16, 32), sizes (e.g., single-width, double-width) and physical configurations of bays.

Other embodiments may include additional types of sleds that provide various types of storage and/or processing capabilities. Other types of sleds may provide power management and networking. Sleds may be individually installed and removed from the chassis 100, thus allowing the computing and storage capabilities of a chassis to be reconfigured by swapping the sleds with different types of sleds, in many cases without affecting the operations of the other sleds installed in chassis 100.

Multiple chassis 100 may be housed within a rack. Data centers may utilize large numbers of racks, with various different types of chassis installed in the various configurations of racks. The modular architecture provided by the sleds, chassis and rack allow for certain resources, such as cooling, power and network bandwidth, to be shared by compute sleds 305a-n and storage sleds 315a-n, thus providing efficiency improvements and supporting greater computational loads.

Chassis 100 may be installed within a rack structure that provides all or part of the cooling utilized by chassis 100. For airflow cooling, a rack may include one or more banks of cooling fans that may be operated to ventilate heated air from within the chassis 100 that is housed within the rack. Chassis 100 may alternatively or additionally include one or more cooling fans 330 that may be similarly operated to ventilate heated air from within the sleds 305a-n, 315a-n installed within the chassis. A rack and chassis 100 installed within the rack may utilize various configurations and combinations of cooling fans to cool the sleds 305a-n, 315a-n and other components housed within chassis 100.

Sleds 305a-n, 315a-n may be individually coupled to chassis 100 via connectors that correspond to the bays provided by chassis 100 and that physically and electrically couple an individual sled to backplane 360.

Chassis backplane 360 may be a printed circuit board that includes electrical traces and connectors that are configured to route signals between the various components of chassis 100 that are connected to backplane 360. In various embodiments, backplane 360 may include various additional components, such as cables, wires, midplanes, backplanes, connectors, expansion slots, and multiplexers. In certain embodiments, backplane 360 may be a motherboard that includes various electronic components installed thereon. Such components installed on motherboard backplane 360 may include components that implement all or part of the functions described with regard to SAS (Serial Attached SCSI) expander 350, I/O controllers 345, network controller 340, and power supply unit 335.

In certain embodiments, compute sleds 305a-n may be IHSs such as described with regard to IHS 102 of FIG. 2. Compute sleds 305a-n may provide computational processing resources that may be used to support a variety of e-commerce, multimedia, business and scientific computing applications, such as services provided via a cloud implementation. Compute sleds 305a-n are typically configured with hardware and software that provide leading-edge computational capabilities. Accordingly, services provided using such computing capabilities are typically provided as high-availability systems that operate with minimum downtime. As described in additional detail with regard to FIG. 2, compute sleds 305a-n may be configured for general-purpose computing or may be optimized for specific computing tasks.

As illustrated, each compute sled 305a-n includes a respective BMC 310a-n. As described in additional detail with regard to FIG. 2, each BMC 310a-n provides capabilities for remote monitoring and management of its respective compute sled 305a-n. In support of these monitoring and management functions, BMCs 310a-n may utilize both in-band and sideband (i.e., out-of-band) communications with various components of a compute sled 305a-n and chassis 100. BMC 310a-n may collect sensor data, such as temperature sensor readings, from components of the chassis 100 in support of airflow cooling of the chassis 100 and the sleds 305a-n, 315a-n. In addition, each BMC 310a-n may implement various monitoring and administrative functions related to compute sleds 305a-n that require sideband bus connections with various internal components of the respective compute sleds 305a-n.

As described in above, BMCs 310a-n may provide capabilities support remote monitoring and managing of IHSs, such as compute sleds 305a-n.

As illustrated, chassis 100 also includes one or more storage sleds 315a-n that are coupled to backplane 360 and installed within one or more bays of chassis 100 in a similar manner to compute sleds 305a-n. Each of individual storage sleds 315a-n may include various different numbers and types of storage devices. For instance, storage sleds 315a-n may include SAS (Serial Attached SCSI) magnetic disk drives, SATA (Serial Advanced Technology Attachment) magnetic disk drives, solid-state drives (SSDs) and other types of storage drives in various combinations. Storage sleds 315a-n may be utilized in various storage configurations by compute sleds 305a-n that are coupled to chassis 100.

Each of compute sleds 305a-n includes storage controller 335a-n that may be utilized to access storage drives that are accessible via chassis 100. Some of the individual storage controllers 335a-n may provide support for RAID (Redundant Array of Independent Disks) configurations of logical and physical storage drives, such as storage drives provided by storage sleds 315a-n. In some embodiments, some or all of individual storage controllers 335a-n may be HBAs (Host Bus Adapters) that provide more limited capabilities in accessing physical storage drives provided via storage sleds 315a-n and/or via SAS expander 350.

In addition to the data storage capabilities provided by storage sleds 315a-n, chassis 100 may provide access to other storage resources that may be installed components of chassis 100 and/or may be installed elsewhere within a rack housing the chassis 100, such as within a storage blade. In certain scenarios, such storage resources 355 may be accessed via a SAS expander 350 that is coupled to backplane 360 of the chassis 100.

SAS expander 350 may support connections to a number of JBOD (Just a Bunch Of Disks) storage drives 355 that may be configured and managed individually and without implementing data redundancy across the various drives 355. Additional storage resources 355 may also be at various other locations within a datacenter in which chassis 100 is installed. Such additional storage resources 355 may also may be remotely located.

As illustrated, chassis 100 of FIG. 3 includes network controller 340 that provides network access to the sleds 305a-n, 315a-n installed within the chassis. Network controller 340 may include various switches, adapters, controllers and couplings used to connect chassis 100 to a network, either directly or via additional networking components and connections provided via a rack in which chassis 100 is installed.

Chassis 100 may similarly include power supply unit 335 that provides the components of the chassis with various levels of DC power from an AC power source or from power delivered via a power system provided by a rack within which chassis 100 may be installed. In certain embodiments, power supply unit 335 may be implemented within a sled that may provide chassis 100 with redundant, hot-swappable power supply units.

Chassis 100 may also include various I/O controllers 340 that may support various I/O ports, such as USB ports that may be used to support keyboard and mouse inputs and/or video display capabilities. Such I/O controllers 345 may be utilized by EC 101 to support various KVM (Keyboard, Video and Mouse) 325a capabilities that provide administrators with the ability to interface with chassis 100 and or its individual blades. EC 101 may also include storage module 325c that provides capabilities for managing and configuring certain aspects of the storage devices of chassis 100, such as the storage devices provided within storage sleds 315a-n and within JBOD 355.

In addition to providing support for KVM 325a capabilities for administering chassis 100, EC 101 may support various additional functions for sharing the infrastructure resources of chassis 100. In some scenarios, EC 101 may implement tools for managing power 335, network bandwidth 340 and airflow cooling 330 that are available via the chassis 100. As described, airflow cooling 330 utilized by chassis 100 may include an airflow cooling system that is provided by a rack in which chassis 100 may be installed and managed by cooling module 325b of EC 101.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A chassis comprising an Enclosure Controller (EC) coupled to a plurality of Information Handling Systems (IHSs) in a chassis, the EC comprising:
    a first processor; and
    a first memory coupled to the first processor, the first memory having first program instructions stored thereon that, upon execution, cause the EC to:
    select a first or second IHS to initiate a first or second Keyboard-Video-Mouse (KVM) session;

register for a notification from the first or the second IHS while the first or the second IHS performs one or more operations, wherein the notification is configured to be generated in response to an event that occurs to the first or second IHS;

switch to the second IHS to initiate a second KVM session; and during the second KVM session, each IHS includes second instructions stored in a second memory and executed by a second processor to:

produce first Optical Character Recognition (OCR) results from respective ongoing video frames of a command-line interface of each respective IHS at ongoing intervals;

when each IHS recognizes a keyword in each respective OCR result of one of the respective video frames, generate the notification, wherein the recognized keyword represents the event; and transmit the notification to the EC.

2. The chassis of claim 1, wherein the first KVM session comprises a remote desktop or a Virtual Network Computing (VNC) session.

3. The chassis of claim 1, wherein the operation comprises a Basic System Input/Output (BIOS) boot-up operation or an IHS maintenance operation.

4. The chassis of claim 1, wherein to register for the notification, the program instructions, upon execution, further cause the EC to receive a notification selection from a user via a Graphical User Interface (GUI).

5. The chassis of claim 1, wherein to register for the notification, the program instructions, upon execution, further cause the EC to receive a keyword.

6. The chassis of claim 1, wherein to receive the notification, the first IHS is configured to:

produce first Optical Character Recognition (OCR) results from a first of a plurality of ongoing video frames of a command-line interface of the first IHS;

produce second OCR results from a second of the ongoing video frames of a command-line interface of the second IHS;

identify differences between the second and first OCR results; and recognize a keyword in the differences, wherein the recognized keyword represents the event.

7. The chassis of claim 1, wherein the program instructions, upon execution, further cause the EC to switch to the first KVM session in response to receiving the notification.

8. A hardware memory of an Enclosure Controller (EC) configured to manage a plurality of Information Handling Systems (IHSs) coupled to a chassis, the hardware memory having program instructions stored thereon that, upon execution, cause the EC to:

select a first IHS to initiate a first Keyboard-Video-Mouse (KVM) session;

register for a notification from the first IHS while the first IHS performs one or more operations, wherein the notification is configured to be generated in response to an event that occurs to the first IHS;

switch to a second IHS to initiate a second KVM session;

during the second KVM session, each IHS includes second instructions stored in a second memory and executed by a second processor to:

produce respective Optical Character Recognition (OCR) results from ongoing video frames of a command-line interface of each IHS at ongoing intervals;

when each IHS recognizes a keyword in the respective OCR results of one of the video frames, generate the notification, wherein the recognized keyword represents the event; and transmit the notification to the EC; and switch to each IHS in response to receiving the notification.

9. The hardware memory of claim 8, wherein the first KVM session comprises a remote desktop or a Virtual Network Computing (VNC) session.

10. The hardware memory of claim 8, wherein the one or more operations comprise a Basic System Input/Output (BIOS) operation.

11. The hardware memory of claim 8, wherein to register for the notification, the program instructions, upon execution, further cause the EC to receive a notification selection via a Graphical User Interface (GUI).

12. The hardware memory of claim 8, wherein to register for the notification, the program instructions, upon execution, further cause the EC to receive a keyword.

13. The hardware memory of claim 8, wherein to receive the notification, the first IHS is configured to:

produce first Optical Character Recognition (OCR) results from a first of a plurality of ongoing video frames of the first IHS;

produce second OCR results from a second of the ongoing video frames of the second IHS;

identify differences between the second and first OCR results; and recognize a keyword in the differences, wherein the recognized keyword represents the event.

14. A method, comprising:

selecting a first information handling system (IHS) to initiate a first Keyboard-Video-Mouse (KVM) session;

registering for a notification from the first IHS while the first IHS performs one or more operations, wherein the notification is configured to be generated in response to an event that occurs to the first IHS;

switching to a second IHS to initiate a second KVM session;

during the second KVM session, performing by second instructions stored in a second memory and executed by a second processor of each IHS:

producing respective Optical Character Recognition (OCR) results from respective ongoing video frames of a command-line interface of each IHS at ongoing intervals;

when the first IHS recognizes a keyword in the respective OCR results of one of the respective video frames, generating the notification, wherein the recognized keyword represents the event; and transmitting the notification to the EC; and performing at least one of switching to the first KVM session or displaying the notification on a display in response to receiving the notification.

15. The method of claim 14, wherein registering for the notification further comprises receiving a notification selection via a Graphical User Interface (GUI).

16. The method of claim 14, wherein registering for the notification further comprises receiving a keyword.

17. The method of claim 14, wherein receiving the notification further comprises:

producing first Optical Character Recognition (OCR) results from a first of a plurality of ongoing video frames of a command-line interface of the first IHS;

producing second OCR results from a second of the ongoing video frames of a command-line interface of the second IHS; and identifying differences between the second and first OCR results; and recognizing a keyword in the differences, wherein the recognized keyword represents the event.

* * * * *